Oct. 14, 1952     E. K. THOMAS     2,613,874
RELIEF VALVE
Filed March 17, 1950
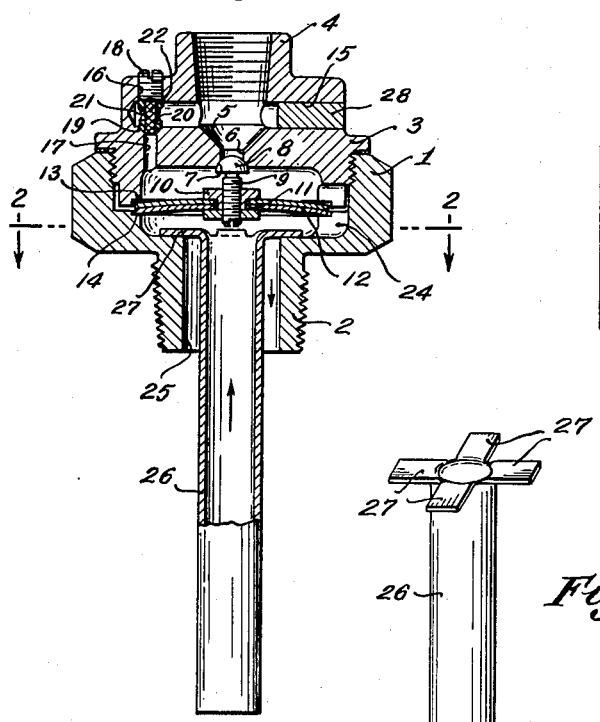
Fig. 1.
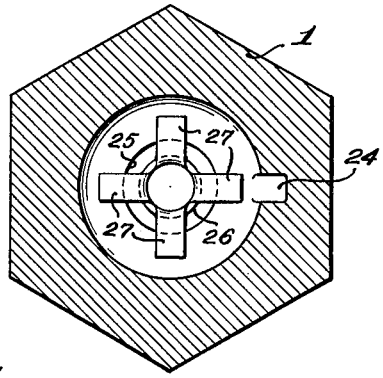
Fig. 2.
Fig. 4.
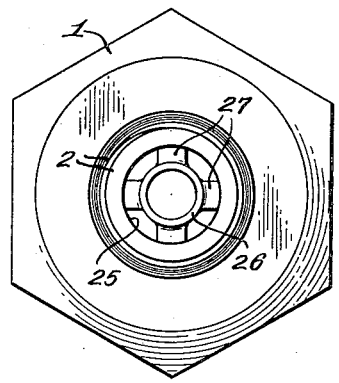
Fig. 3.
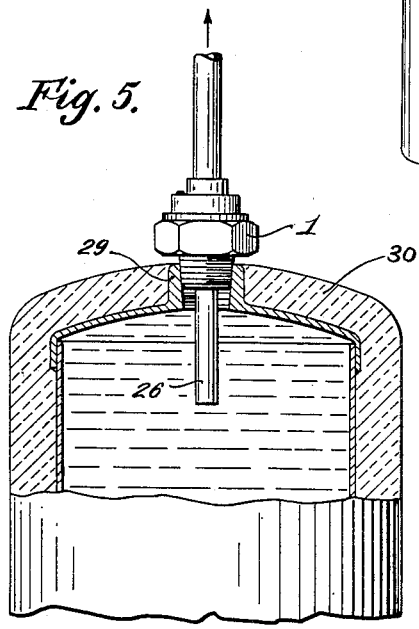
Fig. 5.
Inventor,
Elton K. Thomas,
by Townsend M. Gunn.
Atty.

Patented Oct. 14, 1952

2,613,874

UNITED STATES PATENT OFFICE 2,613,874

RELIEF VALVE

Elton K. Thomas, Norton, Mass., assignor to Metals & Controls Corporation, Attleboro, Mass., a corporation of Massachusetts Application March 17, 1950, Serial No. 150,241

5 Claims. (Cl. 236—48)

This invention relates to relief valves and in particular to temperature relief valves for fluid heating tanks.

Among the several objects of the invention may be noted the provision of a simple and compact form of valve for fluid heating systems adapted to relieve against excessive temperatures in the system; the provision of a temperature relief valve of the class described which is adapted to be responsive more closely to the temperature of the fluid in the container it is designed to protect than hitherto known valves; the provision of a valve of the class described which is so designed as to aid the flow of fluid around the temperature sensitive element of the valve; and the provision of a valve of the class described adapted to be remotely installed on a fluid heating tank and yet follow more closely the temperature of the fluid in the tank than hitherto known valves.

Other objects will be in part obvious and in part pointed out hereinafter.

The invention accordingly comprises the elements and combinations of elements, features of construction, and arrangements of parts which will be indicated in the following claims.

In the accompanying drawing, in which is illustrated one embodiment of the invention, Fig. 1 is a cross section in elevation of the embodiment;

Fig. 2 is a cross section in plan view taken in the direction of lines 2—2 of Fig. 1;

Fig. 3 is a bottom plan view of the valve of Fig. 1;

Fig. 4 is a perspective view of an element of the valve of Fig. 1; and

Fig. 5 is a view in section of the valve mounted on a tank.

Similar reference characters indicate corresponding parts throughout the several views of the drawing.

It is customary to provide temperature relief valves on fluid heating tanks, in order to prevent the fluid in the tank from reaching a dangerous temperature. As an example of such installation, hot water heating tanks such as those used in houses are particularly pertinent. The reason for such practice is well known and need not be detailed further here. However, with the advent of insulated hot water heating tanks, it has sometimes been found difficult to obtain a proper correlation of the temperature at which the valve will operate and the temperature of the water in the tank. The reason for this is that many times it is found necessary for ease of installation and repair, to mount the valve outside the insulation of the tank and thus in a relatively cool ambient. This insulation may be several inches thick, and consequently the valve may be mounted several inches (or remotely, as it were) from the tank. In traversing the distance from tank to valve the water may cool considerably, and also may become entrapped in the valve. It is the purpose of this invention, therefore, to provide a valve which may be so mounted from the tank and yet be so constructed as to lessen the change in temperature of the water in the tank in going from the tank to the sensitive element of the valve, and so constructed that a flow of water from tank to valve and back again is enhanced.

Construction

Referring now to Fig. 1, there is illustrated at numeral 1 a valve housing of suitable metal such as brass or bronze provided with a nipple 2 as an inlet to the valve. Attached to housing 1, as by screwing therein, is a cap 3 of suitable metal provided with an outlet nipple 4 therein. The inner end of the bore of nipple 4 is constricted as indicated at 5 to provide an outlet passage 6 and valve seat 7 on the interior face of cap 3.

Seated against valve seat 7 is the valve member 8 acting as a closure element therefor. Member 8 is mounted on, or forms a part of, valve stem 9 which is threaded into bushing 10. Bushing 10 passes through a central opening 11 in a temperature responsive element which in this embodiment takes the form of a thermostatic snap-acting disc 12. Bushing 10 is fastened to disc 12 in accordance with well known practice. Disc 12, bushing 10, and stem 9 cooperate to hold valve member 8 firmly seated on valve seat 7.

Snap-acting disc 12 is of the general type described in United States Patent No. 1,448,240, dated March 13, 1923, and has a non-developable surface. Its function is to move with a snap action from one position of concavity to an opposite position of concavity on a change of temperature. As drawn, disc 12 is shown in its "cold" position. When subject to heat which raises the temperature of the disc to or above its snapping temperature, disc 12 will snap to a position of opposite concavity, thereby drawing member 8 away from valve seat 7. Disc 12 is held at its peripheral edge by a channel formed between shoulders 13 and 14 respectively in cap 3 and housing 1, said shoulders being dimensioned so that when cap 3 is screwed tightly into housing 1, the separation of shoulders 13 and 14 is slightly greater than the thickness of disc 12. If it is desired to protect disc 12 from the corrosive action of the heating fluid which surrounds it, the disc can be housed in a copper sheathing as shown in United States Patent No. 1,959,906, in which event the separation of shoulders 13 and 14 will be dimensioned to be slightly greater than the thickness of the disc plus the sheathing.

Cap 3 is provided with a transverse bore 15 intersecting bore 4, and a bore 16 which intersects bore 15 at one end thereof. A passageway 17 is provided connecting the interior of housing 1 with bore 15 and is axially in line with bore 16. A valve plug 18 is screwed into bore 16 as shown, and the end 19 of plug 18 is formed to make a valve closure engagement with the end of bore 17. Plug 18 is provided with a cross hole 20 and an axial recess 21 as shown. A low melting point alloy 22 is driven into recess 21, thus sealing it and the cross hole 20. In the event of failure of valve 8 to open, alloy 22 will melt at a predetermined temperature and thus provide an opening via passageway 17, recess 21 and hole 20 into bore 15 and hence to outlet nipple 4. A recess 24 is provided, as shown, in the inner wall of housing 1 in order to enable water to flow on both sides of snap-acting disc 12. This equalizes the hydrostatic pressure on the sides of disc 12.

Bore 15 which, for ease in manufacturing, has been drilled transversely into the cap 3 as shown, has its end sealed by means of plug 28, which may be either driven or screwed tightly into the end of the bore.

Mounted within nipple 2 and spaced away from the interior wall 25 thereof, is a metal tube 26. For mounting purposes, tube 26 is provided with a spider at its inner end having legs 27, the legs 27 serving to support tube 26 within nipple 2. Legs 27 of the spider may be soldered or otherwise fastened to the inner side of housing 1, as shown, in order to hold the tube in position. This spider mounting of tube 26 is used in order to allow space for water to flow from the interior of housing 1 out of the valve through the spacing between tube 26 and wall 25.

Tube 26 is so mounted that its upper (or interior) end is adjacent the lower side of snap-acting disc 12. Thus any water flowing upwardly in tube 26 will emerge from the top of the tube to flow against the surface of disc 12 and thus heat it. By means of tube 26, therefore, water may be directed specifically to the temperature sensitive element of the valve. A spider 27 is shown here as the supporting means for tube 26, but it is apparent to anyone skilled in the art that other means of mounting will serve as well, such as, for example, a screen or grid of wires fastened over the inner end of nipple 2 and to the center which may be soldered or otherwise fastened on end of tube 26. In any such alternatives, the main point is to mount tube 26 so that its inner or delivery end is positioned to direct a flow of hot water against disc 12.

*Operation*

The valve is mounted on the top of a hot water tank as shown in Fig. 5; nipple 2 screwing into a tubular extension 29 on the tank, which extends through whatever insulation 30 which may be used on top of the tank, tube 26 being inserted into the water of the tank. Tube 26 is purposely made long enough to extend several inches into the water at the top of the tank. It will now be seen that tube 26 acts as a conduit to allow hot water to rise by natural convection up the interior of tube 26, striking and flowing around disc 12 and becoming somewhat cooled in the process; then this cooled water will flow down through spider 27 and through the opening provided between tube 26 and interior wall 25, and back into the tank. The tube 26, in other words, provides distinct channels to facilitate the rising of hot water by natural convection currents, and the falling of cool water. Thus, not only is hot water from the tank led directly to the temperature sensitive element 11, but in addition, the use of tube 26 induces constant circulation of water around the temperature sensitive element; both of these factors are greatly to be desired in any temperature responsive device.

Disc 12 may be adjusted, by means of the threaded engagement of stem 9 with bushing 10, to snap when the temperature of the water surrounding the disc reaches a given point. This temperature is determined by the amount of expected differential between valve and tank for a given installation, and the maximum safe temperature of the water in the tank. Upon reaching snapping temperature, disc 12 will snap to a position of opposite concavity, thus opening valve 7 and allowing hot water to drain from the tank through outlet 4. It will be understood, of course, that all differential between tank temperature and disc temperature may not be eliminated. This invention lessens greatly the differential otherwise encountered. Cold water will then be allowed to flow into the tank in the normal system on which such valves are used, thus cooling the water in the tank to a safe temperature. Upon the water in the tank reaching a safe temperature, disc 12 will automatically snap to the position shown in Fig. 1, thus closing valve 7.

Tests have shown that (for a given installation) where a valve of this nature, but not provided with tube 26, has been mounted on a tank, as much as 17 degrees difference existed between the water in contact with disc 12 and the hot water in the tank. With the use of tube 26, this difference in temperature was reduced, in the sample tried, to only 4 degrees. The amount of reduction of temperature differential is dependent, of course, on several factors including the temperature of the ambient surrounding the valve and the distance the valve is mounted away from the top of the tank, but in all cases the use of the tube 26 will substantially reduce the temperature differential between the water in the tank and the water around the temperature-sensitive element 11.

I claim:

1. A temperature relief valve comprising a body having inlet and outlet passages with a communicating opening between said passages, a valve member for closing and opening said communicating opening, a snap-acting thermostat element mounted within said body and carrying said valve member so as to control the latter, and a tube disposed in said inlet passage with one end extending out from said body, and the other end lying in proximity to said snap-acting thermostat element, said tube being spaced away from at least a part of the interior wall of said inlet passage; whereby heated fluid from the container on which said valve is to be mounted may be directed by said tube into contact with said snap-acting element.

2. A temperature relief valve comprising a body having inlet and outlet passages with a communicating opening between said passages, a valve member for closing and opening said communicating opening, a snap-acting thermostat element mounted within said body and carrying said valve member so as to control the latter, and a tube disposed in said inlet passage with one end extending out from said body and the other end lying in proximity to said snap-acting element, said tube being smaller in diameter than said inlet passage in order to leave a space between the wall of said tube and said inlet passage, and being mounted in said inlet passage in such way as to permit fluid to flow outwardly from the interior of said body through said space, said tube and inlet passage co-acting to cause heated fluid to flow from the fluid container on which said relief valve is mounted up said tube to strike said snap-acting element and thereafter flow down to said container through said space.

3. In a temperature relief valve having inlet and outlet passages, a thermostatic element mounted within said valve, and a valve member operated thereby for controlling a communicating opening between said passages, a tube mounted within said inlet passage and extending from said relief valve for immersion in a heated fluid container, said tube being so mounted as to provide a space between it and the inner wall of said inlet passage for the flow of fluid therethrough, and the inner end of the tube being positioned in close proximity to the thermostatic element of the valve, whereby fluid may flow from the container to said element through said tube and back to said container through the space between the tube and the wall of the inlet passage.

4. A relief valve for a hot water tank, comprising a body having inlet and outlet passages with a communicating opening between said passages, a valve member for closing and opening said communicating opening, temperature responsive means for controlling said valve member, said inlet passage comprising a two-channel passage, one of said channels being for the flow of fluid to said temperature responsive means and the other being for the flow of fluid away from said means while said communuicating opening is closed, and both channels being for the flow of fluid to said outlet passage while said communicating opening is open.

5. A temperature relief valve comprising a body having a central chamber and inlet and outlet passages to said chamber, a partition across said chamber dividing it into inlet and said outlet chambers, an opening in said partition, a valve member controlling said opening, snap-acting thermostatic means mounted in said inlet chamber and controlling said valve member, and elongated tubular means mounted in said inlet passage with a channel between it and said inlet passage, the inner end of said tubular means being in proximity to said thermostatic means, whereby fluid from the container on which said relief valve is to be mounted may flow upwardly into said inlet in said tubular means, strike said thermostatic means on emergence therefrom, and flow downwardly into said container through said channel.

ELTON K. THOMAS.

REFERENCES CITED

The following references are of record in the file of this patent:

UNITED STATES PATENTS

| Number | Name | Date |
| --- | --- | --- |
| 989,128 | Deegan | Apr. 11, 1911 |
| 1,874,909 | Conklin | Aug. 30, 1932 |
| 1,972,171 | Spencer | Sept. 4, 1934 |
| 2,107,673 | Lovekin | Feb. 8, 1938 |